Dec. 19, 1944.　　W. H. FISCHER　　2,365,259
COATING APPARATUS
Filed Oct. 19, 1942　　2 Sheets-Sheet 1
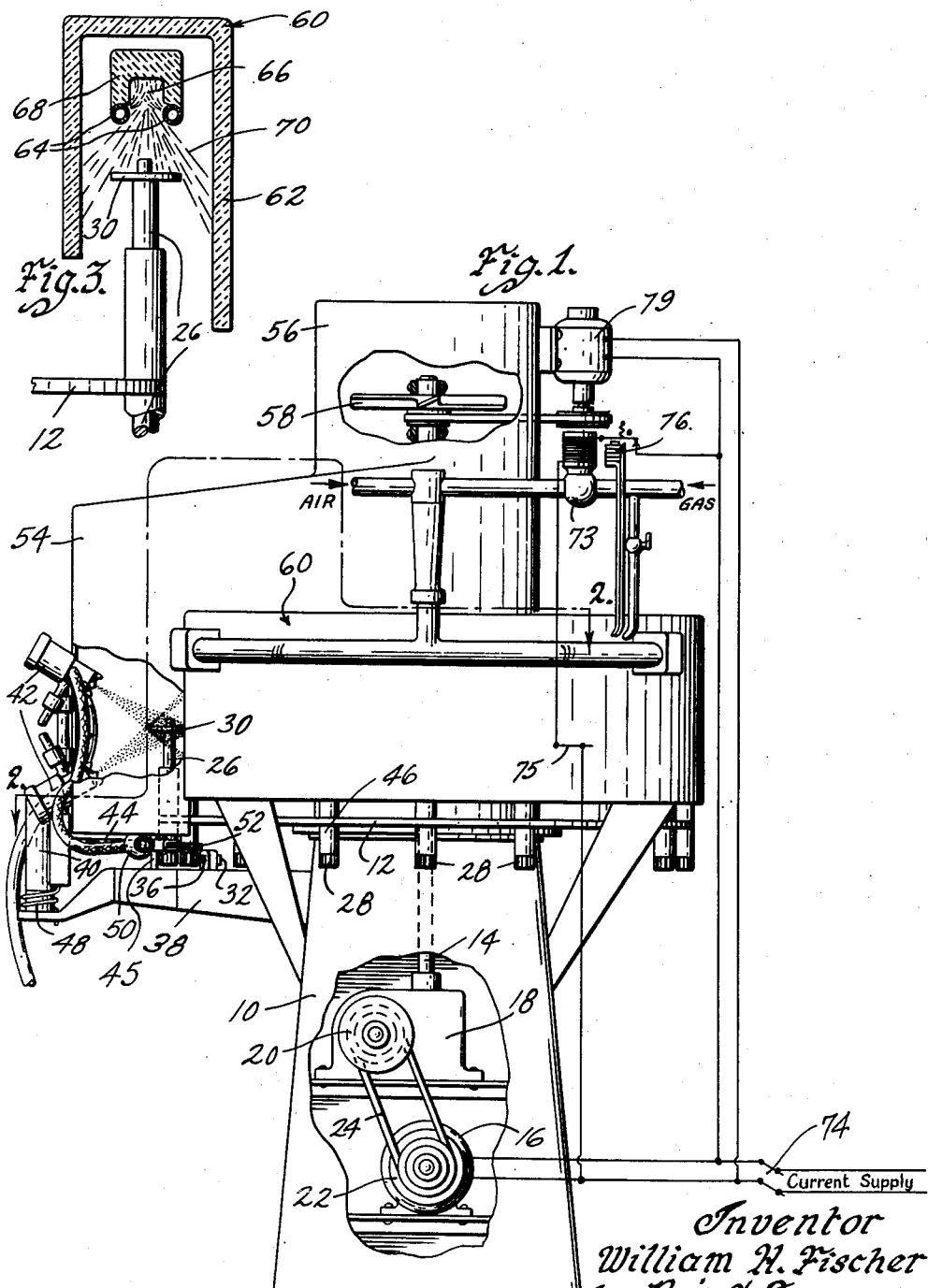
Inventor
William H. Fischer
by Bair & Trueman
Attorneys Dec. 19, 1944.  W. H. FISCHER  2,365,259
COATING APPARATUS
Filed Oct. 19, 1942   2 Sheets-Sheet 2
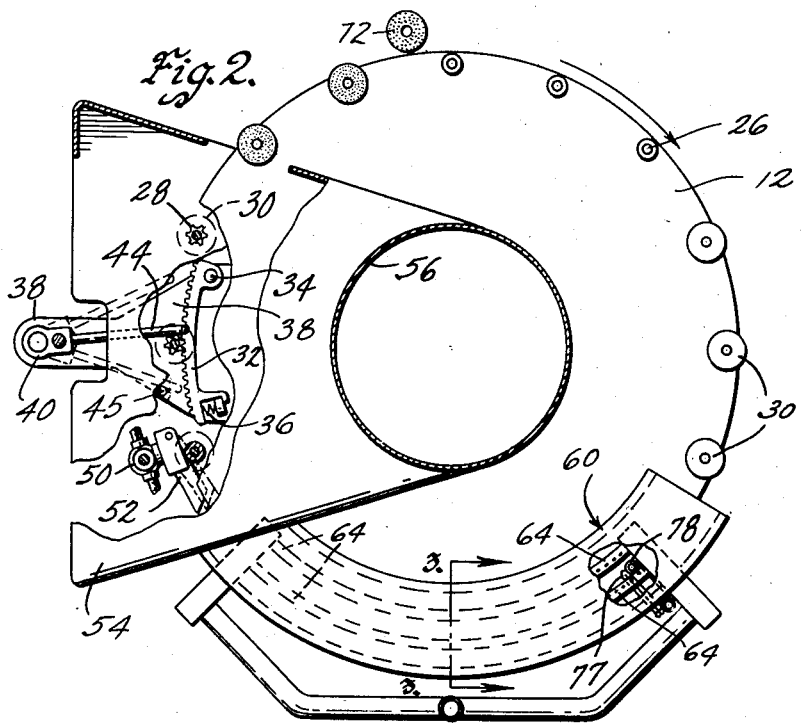
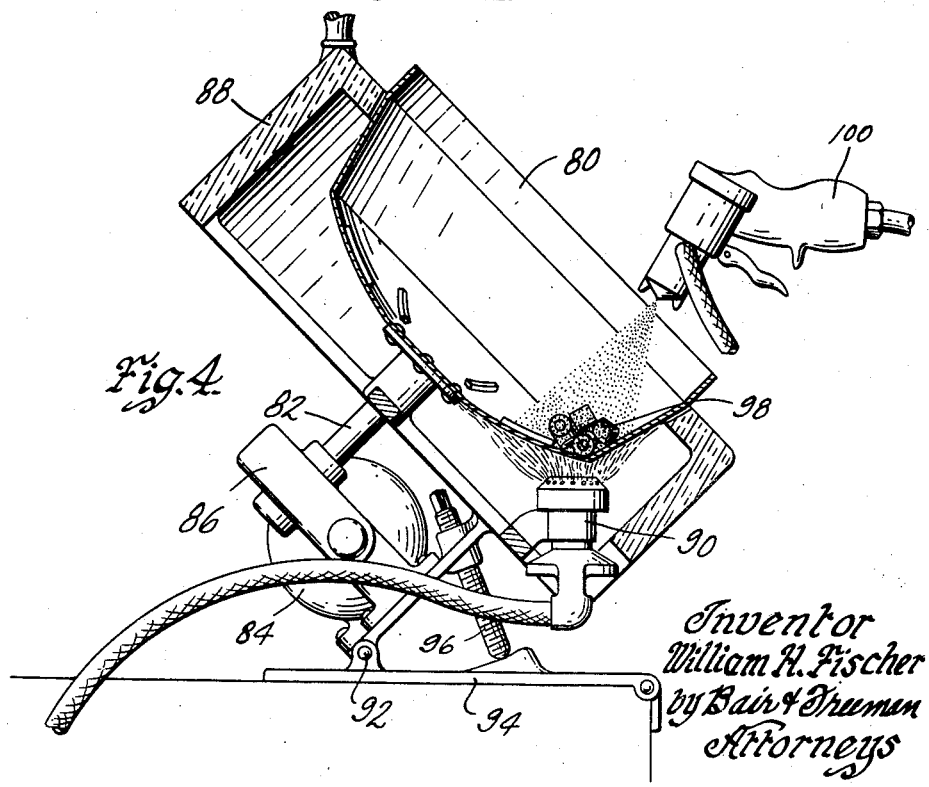
Inventor
William H. Fischer
by Bair & Freeman
Attorneys Patented Dec. 19, 1944

2,365,259

UNITED STATES PATENT OFFICE 2,365,259

COATING APPARATUS

William H. Fischer, Des Plaines, Ill., assignor to Process Engineering Corporation, Chicago, Ill., a corporation of Illinois Application October 19, 1942, Serial No. 462,553

1 Claim. (Cl. 91—18)

My invention relates to an improved coating apparatus.

The finishing of manufactured articles by spray application of a liquid coating is of course well known. These coatings may be of various types, but they are commonly subjected to heat after application. The purpose of the heating is to accelerate evaporation, polymerization or oxidation of substances in the liquid vehicle, so that the coating hardens or becomes fixed. The disadvantage of heating the coated articles after the spray operation is that it takes an appreciable time, and in this time the coating may run or sag, causing thin spots or gaps in the coat, with drips or heavy accumulations of material around the lower portions of the articles.

It is an object of my invention to provide an apparatus for applying such coatings wherein the coating is fixed almost instantaneously as it is sprayed on.

It is a further object of my invention to provide an apparatus whereby liquid coatings may be applied in a spray of fine particles, with a minimum of unevenness in the coating due to running or sagging after application.

It is a further object to provide an apparatus whereby a liquid coating material may be applied to articles, and the articles may be handled without injury to the coating, immediately after the application.

With these and other objects in view, my invention relates to the construction and arrangement of the parts of the apparatus which I have invented for carrying out the coating operation, whereby the objects contemplated are attained, as hereinafter more fully set forth, pointed out in my claims and illustrated in the accompanying drawings, in which:

Figure 1 is an elevational view of a type of machine suitable for carrying out the coating operation, parts being shown broken away for better illustration of the construction;

Figure 2 is a plan view of the same, partly in horizontal section on the line 2—2 of Figure 1;

Figure 3 is a vertical sectional view through the heater, taken on the line 3—3 of Figure 2, and Figure 4 is a view, partly in vertical section, of another type of machine which may be employed in carrying out the coating operation.

As indicated above, the coating operation has reference to the application of a finish coating to various kinds of articles. It is, for example, particularly adaptable for the application by spraying of coating fluids which have an aqueous vehicle, or which are so thin in consistency that they flow readily when applied. With coating materials of this nature, it is extremely difficult to get a uniform coat, since the fluids tend to run under the influence of gravity or under the force of the air in the spray jet, so that a non-uniform coating results; and if any appreciable time is required for drying, the irregularity may be so great as to make the finished product entirely unsatisfactory. This problem is encountered in the application of graphite coating materials, where the liquid to be sprayed includes a colloidal suspension of graphite in water. Unless some provision is made by which the sprayed coating is set immediately, almost as soon as it is applied, the results are not satisfactory. Graphite coatings applied by spraying are now widely used for bearing surfaces, gear teeth, and other surfaces which must have smooth-running characteristics, and where it may be impractical to use an oil type lubricant, because of the likelihood of trouble due to evaporation, gumming, freezing, or other difficulties which arise when oil or grease are used. Many of these uses are in equipment where uniformity and certainty of results are paramount factors, and where, consequently, a uniform coating must be obtained if that is at all possible.

Where drying or fixation of the coating takes place through evaporation of a volatile vehicle, as in the case of the aqueous vehicle materials just described, I have found that if the parts to be coated are heated before the spray operation, to temperatures appreciably above the boiling point of the vehicle, they dry very rapidly—almost instantaneously—when sprayed. It thus becomes possible to apply a smooth, uniform coat.

With a water vehicle, for instance, the temperature of the part may be in the neighborhood of 225°–300° F. Heating substantially above the boiling point is necessary because the blast of air in the spray, and the evaporation, remove heat rapidly from the part, and the part must therefore contain enough excess of heat to dry the entire coating to completion.

With coating materials in which mere evaporation is not so important, but in which oxidation or polymerization are more substantial factors, the proper temperature will not ordinarily be determined by the boiling point, but by trial to ascertain the optimum value for quick fixation of the coating.

It will be apparent that in either case my process has the advantage that the coat is heated from the inside out, so that rapid fixation is not impeded by the formation of an external skin over still fluid material, as sometimes happens when external heat is applied after the spray operation.

In Figures 1-3 of the drawings, I have illustrated a type of machine which is particularly suited for carrying out my process on parts of sufficient size to justify individual handling by an operator. The reference numeral 10 indicates a support pedestal upon which a work table 12 is rotatably supported. The table may be journaled on a shaft 14 which is driven by a motor 16 through a reduction gear 18. Connection of the motor to the reduction gear 18 by means of the cone pulleys 20 and 22 and the belt 24 permits the selection of several different speeds, as may be desirable for work upon articles of different sizes or weights, as will be subsequently made clear.

Around the periphery of the work table 12, I provide rotatable spindles 26 which project below the table and terminate in pinions 28. At their upper ends, these spindles may be provided with any suitable type of fixture for retaining the articles 30 which are to be coated.

In the drawings, I have illustrated a structure in which the work table rotates clockwise, as viewed in Figure 2, the direction being indicated by an arrow in the upper part of the figure.

Adjacent the path traversed by the pinions 28 as the table 12 rotates, I provide a segment rack 32 which may be pivoted at one end on the bolt 34, and spring urged at the other end by a spring 36. As the table rotates, each pinion in turn engages the rack 32 and is rotated by it. Provision of the spring 36 prevents jamming, since the segment can yield until the teeth on the pinion and segment engage properly. Beneath the segment 32, I support on the pedestal 10 an arm or bracket 38 on which a post 40 is pivoted on a vertical axis. The spray guns 42, any desired number of which may be provided, are mounted on the post 40. Extending from the post is an arm 44 which engages the mounting bushing 46 of each spindle as it passes by. A spring 48 tends to rotate the post 40 in a clockwise direction, as viewed in Figure 2. Each spindle as it passes by engages the arm 44, thus rotating the post 40 and causing the spray jets to follow the spindle as it moves along, until the arm 44 has moved to the upper dotted line position shown in Figure 2, when it snaps free of the bushing 46 and returns under the influence of the spring 48 to the initial position represented by the lower dotted lines in Figure 2, ready for engagement with the next spindle.

During the time when the spray guns are following each spindle in the manner described, the air for the spray jet is turned on by a valve 50 in the airline, controlled by a cam 52 which is engaged by the bushings 46 in passing. The shape of the cam can be altered according to requirements, so that the spray jets need to be in operation only long enough to coat each piece properly, and thus a saving in the compressed air requirements is effected. A draft hood 54 is provided to enclose the region in which the spray operations take place, the fumes and spray residues being carried off through duct 56 by a motor driven fan 58.

An operator takes off the completed articles at the point 72, and replaces them with the work to be coated.

Many features of the apparatus thus far described are more or less representative of common practice in the spray painting industry. However, to the best of my knowledge, no one has employed the method of preheating parts to a temperature such that the sprayed material will dry instantly on them. For this purpose, I provide a heater unit, indicated generally as 60. It consists of an insulated hood 62, curved to conform to the path of the work spindles, and enclosing a radiant type of heater, which employs a pair of burner tubes 64 having rows of perforations through which jets of flame 66 play upon a block of refractory material 68. The refractory material is thus raised to a very high temperature, such that it becomes itself a radiant source, the radiation from it being indicated by the lines 70 in Figure 3.

It will be observed, in Figure 2, that the heater is of such length as to cover approximately one-fourth of the circumference of the work table. This proportion is not critical, of course, since it may vary widely with different types of work conveyor systems. The object is that the heat supply shall be sufficient, for the speed at which the work conveyor operates, to raise the articles or work pieces 30 to the desired temperature, as previously described, before they reach the spray. When this is done, and when the spray guns are properly adjusted, the sprayed liquid will dry on the articles almost as fast as it is applied.

In actual practice, using a material with an aqueous vehicle on small gears and similar items, I have found that spraying the articles while they turn on the spindles through approximately two revolutions is sufficient, and when all factors are properly adjusted, the sprayed coating which is applied on one edge of the work pieces will be dry before that edge completes its revolution and comes into position for another coat. Obviously, the exact results will vary according to the speed of the machine, the weight, shape and specific heat of the articles, the type of coating material, and with other variable factors. Nevertheless, the description given will illustrate the results which can be obtained with my method, and will indicate the type of operation which can be performed with the apparatus illustrated.

To simplify operation of the machine, I provide for control of the gas to the heater 60 by means of a solenoid valve 73 in the gas line. This valve is connected to the current supply on the load side of a switch 74, through a switch 75 and a relay 76. The relay coil is energized by a thermocouple 77 located adjacent the pilot light 78, so that the relay contacts are closed only when the pilot light is lighted. The fan motor 79 is also connected on the load side of the switch 74. Thus, when the switch 74 is opened, the machine is entirely shut down—the motors 22 and 79 are stopped, and the main gas supply controlled by the valve 73 is shut off. This eliminates the possibility of waste or of damage to the machine by carelessness on the part of the operator. The switch 75 may be opened when it is desired to run the machine without heat, as may be the case while the spray guns are being adjusted in position, or while other operations are being performed.

With smaller articles it may be impractical, from the cost standpoint, to have each individual piece handled by an operator, and for situations of this kind the apparatus illustrated in Figure 4 may be used. It consists of a tumbling pan 80 mounted on an inclined shaft 82 and slowly rotated by a motor 84 through suitable reduction gearing 86. The pan is surrounded by an insulated casing 88 and has located beneath it a gas burner or other suitable heating device 90. The whole assembly is pivoted at 92 on a plate 94, so that the angle of inclination of the shaft 82 may be adjusted by rotation of a screw 96. Articles 98 to be coated are placed in the pan 80, where they are slowly tumbled, while the burner operates to bring them up to the desired temperature, which is in the neighborhood of 250° to 275° F. when a spray liquid with an aqueous vehicle is used. When the proper temperature is reached, the articles are sprayed with a hand gun 100 while the tumbling is continued to give the spray access to all parts of the batch.

Some changes may be made in the details of procedure involved, and in the construction and arrangement of the parts of the devices which I have invented for carrying out the coating operation described without departing from the real spirit and purpose of my invention, and it is my intention to cover by my claim any variant modified forms of structure or use of mechanical equivalents which may be reasonably included within its scope.

I claim:

Apparatus for applying coatings consisting of a rotating work table, a plurality of work holders on the periphery thereof, a heater mounted adjacent the work table, so arranged that articles carried by said work holders will be heated as said table is rotated, an electric motor driving said table, a gas supply line to said heater, an electrically controlled valve in said supply line, and a switch arranged to energize or deenergize said motor and said valve simultaneously, said valve shutting off the flow of gas when deenergized.

WILLIAM H. FISCHER.